United States Patent
Darling

(10) Patent No.: US 10,505,199 B2
(45) Date of Patent: Dec. 10, 2019

(54) METHOD OF TREATING CARBON ELECTRODE

(71) Applicant: United Technologies Corporation, Farmington, CT (US)

(72) Inventor: Robert Mason Darling, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/564,278

(22) PCT Filed: Apr. 9, 2015

(86) PCT No.: PCT/US2015/025023
§ 371 (c)(1),
(2) Date: Oct. 4, 2017

(87) PCT Pub. No.: WO2016/164017
PCT Pub. Date: Oct. 13, 2016

(65) Prior Publication Data
US 2018/0138520 A1    May 17, 2018

(51) Int. Cl.
*H01M 4/88* (2006.01)
*H01M 8/18* (2006.01)
(Continued)

(52) U.S. Cl.
CPC .......... *H01M 4/8882* (2013.01); *C25B 11/12* (2013.01); *H01M 4/88* (2013.01); *H01M 4/8878* (2013.01);
(Continued)

(58) Field of Classification Search
CPC .......... C25B 11/12; H01M 4/88; H01M 4/882; H01M 4/96; H01M 8/188; H01M 4/8878; H01M 4/8882; Y02E 60/528
See application file for complete search history.

(56) References Cited

U.S. PATENT DOCUMENTS 3,212,930 A * 10/1965 Thompson ............ C04B 41/009
204/294
4,931,542 A * 6/1990 Tsuchida ............ C08G 75/0268
528/373
(Continued)

FOREIGN PATENT DOCUMENTS

CN  102136579  7/2011
JP  S6366325  3/1988
(Continued)

OTHER PUBLICATIONS

Supplementary European Search Report for European Patent Application No. 15888669 completed Sep. 12, 2018.
(Continued)

*Primary Examiner* — Ciel P Thomas
(74) *Attorney, Agent, or Firm* — Carlson, Gaskey & Olds, P.C.

(57) ABSTRACT

A method of treating a carbon electrode includes heat treating a carbon-based electrode in an environment that is above approximately 325° C. and that includes an oxidizing gas, and prior to use of the carbon-based electrode in an electro-chemical battery device, soaking the carbon-based electrode in an oxidizer solution.

24 Claims, 1 Drawing Sheet

(51) Int. Cl.
*H01M 4/96* (2006.01)
*C25B 1/12* (2006.01)
*C25B 11/12* (2006.01)

(52) U.S. Cl.
CPC ............ *H01M 4/96* (2013.01); *H01M 8/188* (2013.01); *Y02E 60/528* (2013.01)

(56) References Cited

U.S. PATENT DOCUMENTS

| | | | |
|---|---|---|---|
| 5,218,757 | A | 6/1993 | Kaneko et al. |
| 5,582,715 | A * | 12/1996 | McBrayer, Jr. .......... B01J 3/008 210/143 |
| 5,711,988 | A | 1/1998 | Tsao et al. |
| 6,444,347 | B1 | 9/2002 | Ouvry et al. |
| 2003/0036001 | A1 | 2/2003 | James et al. |
| 2014/0370395 | A1 | 12/2014 | Kostecki et al. |

FOREIGN PATENT DOCUMENTS

| | | |
|---|---|---|
| JP | 2001216974 | 8/2001 |
| JP | 2006334527 | 12/2006 |
| JP | 5283083 | 9/2013 |
| JP | 2014029035 | 2/2014 |
| WO | 2012175997 | 12/2012 |
| WO | 2014149192 | 9/2014 |

OTHER PUBLICATIONS

Sun, B. and Skyllas-Kazacos, M. (1992). Chemical modification of graphite electrode materials fro vanadium redox flow battery application—part II. acid treatments. Electrochimica Acta, vol. 37(13). 1992. pp. 2459-2465.

Men, Y. and Sun, T. (2012). Carbon felts electrode treated in different weak acid solutions through electrochemical oxidation method for all vanadium redox flow battery. Int. J. Electrochem Sci., 7. 2012. pp. 3485-3488.

International Preliminary Report on Patentability for PCT/US2015/025023 dated Oct. 10, 2017.

International Search Report and Written Opinion for International Application No. PCT/US2015/25023 completed Jul. 2, 2015.

* cited by examiner

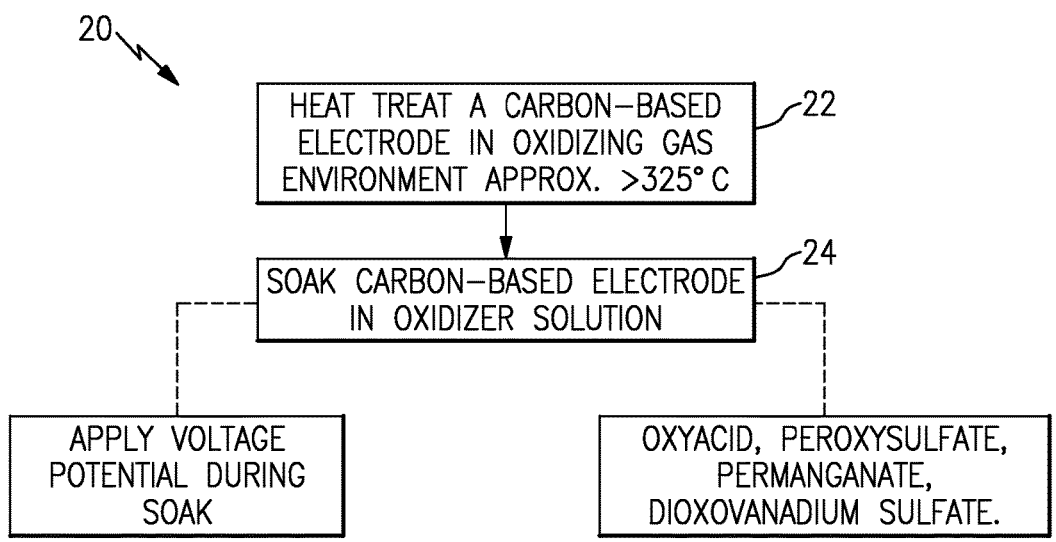

METHOD OF TREATING CARBON ELECTRODE

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand. Flow batteries are distinguished from other electrochemical devices by, inter alia, the use of one or more externally-supplied, liquid electrolyte solutions that include reactants that participate in reversible electrochemical reactions.

A typical flow battery includes a redox flow cell that has a negative electrode and a positive electrode separated by an electrolyte layer, which may include a separator, such as an ion-exchange membrane. The electrodes can be porous carbon materials, such as graphite felts or graphite papers. A negative liquid electrolyte is delivered to the negative electrode and a positive liquid electrolyte is delivered to the positive electrode to drive electrochemically reversible redox reactions. Over time, catalytic performance can decay, particularly at the negative electrode, due to chemical reduction of electrode surface groups, requiring electrode replacement or regeneration.

SUMMARY

Disclosed is a method of treating a carbon electrode. The method includes heat treating a carbon-based electrode in an environment that is above approximately 325° C. and that includes an oxidizing gas, and prior to use of the carbon-based electrode in an electro-chemical battery device, soaking the carbon-based electrode in an oxidizer solution.

In another aspect, a method includes heat treating a carbon-based electrode in an air environment that is approximately 400° C. to approximately 450° C., prior to use of the carbon-based electrode in an electro-chemical battery device soaking the electrode in an oxidizer solution that includes an oxidizer selected from oxyacid, peroxysulfate, permanganate, ozone, dioxovanadium sulfate, and combinations thereof and, during the soaking, applying a voltage potential to the carbon-based electrode.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example method of treating a carbon electrode.

DETAILED DESCRIPTION

Although not limited to flow batteries, the examples herein can be used in the preparation of a carbon-based electrode for a flow battery. For example, the negative electrode of a flow battery can decay and thus debit the performance and/or reduce the life of the flow battery. The mechanisms of decay can include, by way of example and not limitation, decay by reduction of oxide species on the electrode from electrode overpotential. The oxide species serve as active catalytic sites and such decay debits the performance of the electrode, and can require maintenance operations to replace or regenerate the electrode. The examples herein provide treatments for use in the preparation of a carbon-based electrode that can have enhanced performance and durability with regard to decay of oxide species.

FIG. 1 illustrates an example method 20 of treating a carbon-based electrode (hereafter "carbon electrode"). For example, the carbon electrode is formed of carbon and can have a porous carbon structure, such as carbon paper or carbon felt. The electrode can be substantially pure carbon, with trace amounts of inadvertent impurities. Initially the carbon electrode can be substantially free of oxides, such as surface carbon oxides, and has not yet been used in an electro-chemical battery device. A low concentration of surface oxides may be present from spontaneous oxidation of the carbon, but such oxidation is not from the purposeful treatment of the carbon electrode and the amount of carbon oxides is unsuitable for purposes of use of the carbon electrode as an electrode catalyst.

In this example, the carbon electrode is first subjected to a heat treatment step 22 and then a soak step 24. The heat treatment step 22 includes heat treating the carbon electrode in an environment (gas) that is above approximately 325° C. and that has an oxidizing process gas. In one example, the oxidizing process gas is air (approximately 21 vol % oxygen, approximately 78 vol % nitrogen, and a remainder of trace other gases). Alternatively, the oxidizing process gas can include an additional inert gas, such as but not limited to argon, substituted for all or some of the nitrogen. The amount of oxygen or other oxidizing gas in the oxidizing process gas may be at least approximately 15 vol % for effective treatment in the heat treatment step. In one further example, the temperature is approximately 400° C. to approximately 450° C. in air for between 4 and 40 hours. The term "approximately" used with reference to gas composition or temperature refers to fractional variation and variation within typical measurement error.

Without being bound to a particular theory, the heat treat step 22 is believed to prepare the carbon electrode for the next step, the soak step 24, by initially forming oxide groups on the surface of the carbon electrode, increasing defect sites, and increasing surface area. The composition of the oxide groups may be varied, some of which may be relatively low stability oxides and others of which may be relatively higher stability oxides. The heat treatment may or may not also change or influence the degree of graphitization of the surface layers on carbon fibers in the electrode.

After the heat treatment step 22, and still prior to insertion into an electro-chemical battery device, the carbon electrode is subjected to the soak step 24 in which the carbon electrode is soaked in an oxidizer solution (liquid). Again, without being bound to a particular theory, the oxidizer solution is believed to form additional carbon oxide groups on the surface of the carbon electrode and/or increase the oxidation state of carbon oxide groups or other oxides that are present from the heat treat step 22 For example, the oxidizer salutation might convert carbonyl groups to carboxyl groups. Thus, the heat treatment step 22 and the soak step 24 cooperatively function in that the heat treatment forms crude oxides and the soak refines the crude oxides to more stable or desirable oxides.

The oxidizer solution includes at least one oxidizer selected from peroxide ($H_2O_2$), oxyacid, peroxysulfate, permanganate, dioxovanadium sulfate (oxidation state 5, $VO_2^+$), or combinations thereof. For example, the oxidizer solution is an aqueous solution. One example of such a solution is a 2M solution of sodium persulfate. An oxyacid is an acid that includes oxygen, hydrogen and at least one other element such that the hydrogen can disassociate in solution. Example oxyacids can include perbromic acid ($HBrO_4$) and hypochlorous acid (HClO). A peroxysulfate includes sulfate ions in solution. An example peroxysulfate can include sodium peroxydisulfate ($Na_2S_2O_8$). Peroxysulfates and peroxides may limit the generation of byproducts, and peroxysulfates can be used under relatively mild conditions. A permanganate includes manganate ions in solution. An example permanganate can include potassium permanganate ($KMnO_4$).

In one further example, the oxidizer solution is not heated (e.g., is at ambient temperature, nominally 20-30° C.) and the carbon electrode is soaked for approximately 4 to 72 hours, depending on the strength of the oxidizer. In one modification, the oxidizer solution is heated to accelerate the process and reduce the soak time. As an example, the oxidizer solution is approximately 25° C. to 85° C.

In a further example, either with or without heat, a voltage is applied to the carbon electrode during the soaking to accelerate the process and reduce soak time. For instance, the voltage is approximately 1.4 volts to approximately 2.0 volts versus a standard hydrogen reference electrode. Below approximately 1.4 volts oxidation may be too slow for the application of voltage to be effective, and a potential above approximately 2.0 volts can cause evolution of oxygen from the oxidizer solution and reduce process efficiency. The term "approximately" used with reference to voltage refers to fractional variation in the hundredths decimal and variation within typical measurement error.

After the soak step 24, the carbon electrode can be removed from the oxidizer solution and rinsed, such as in deionized water, to remove any residual oxidizer solution. The carbon electrode is then considered to be catalytically activated for use in a flow battery or other such electro-chemical device. Carbon electrodes treated according to the examples herein can have better initial performance with respect to current output than comparable carbon electrodes that were either only heat treated or only soaked. Carbon electrodes treated according to the examples herein can also have better durability with respect to current output versus time than comparable carbon electrodes that were only heat treated and can have similar durability as comparable carbon electrodes that were only soaked, but with less treatment time.

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURES or all of the portions schematically shown in the FIGURES. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of treating a carbon electrode, the method comprising:
   (a) heat treating a carbon-based electrode in an environment that is above approximately 325° C. and that includes an oxidizing gas; and
   (b) prior to use of the carbon-based electrode in an electro-chemical battery device, soaking the carbon-based electrode from said step (a) in an oxidizer solution, and applying a voltage potential to the carb-based electrode during step (b), wherein the voltage potential is selected such that it does not cause evolution of oxygen from the oxidizer solution.

2. The method as recited in claim 1, wherein the oxidizer solution comprises an oxidizer selected from the group consisting of peroxide, oxyacid, peroxysulfate, permanganate, dioxovanadium sulfate ($V(V)_{aq}$), and combinations thereof.

3. The method as recited in claim 1, wherein the oxidizer solution comprises peroxide.

4. The method as recited in claim 1, wherein the oxidizer solution comprises oxyacid.

5. The method as recited in claim 1, wherein the oxidizer solution comprises peroxysulfate.

6. The method as recited in claim 1, wherein the oxidizer solution comprises permanganate.

7. The method as recited in claim 1, wherein the oxidizer solution comprises ozone.

8. The method as recited in claim 1, wherein the oxidizer solution comprises vanadium oxide (V).

9. The method as recited in claim 1, wherein the temperature is approximately 400° C. to approximately 450° C.

10. The method as recited in claim 1, wherein the voltage potential is approximately 1.4 to approximately 2.0 volts versus a standard hydrogen reference electrode.

11. The method as recited in claim 1, wherein the carbon-based electrode initially in said step (a) is substantially free of oxides.

12. The method as recited in claim 11, wherein the heat treating causes oxide groups to form on a surface of the carbon-based electrode.

13. The method as recited in claim 12, wherein the soaking causes oxide groups to form on the surface of the carbon-based electrode.

14. The method as recited in claim 12, wherein the soaking increases the oxidation step of the oxide groups formed by the heat treating.

15. The method as recited in claim 1, wherein the oxidizing gas comprises at least approximately 15 vol % oxygen.

16. The method as recited in claim 1, further comprising rinsing the carbon-based electrode after the soaking step to remove residual oxidizer solution from the carbon-based electrode.

17. A method of treating a carbon electrode, the method comprising:
   (a) heat treating a carbon-based electrode in an air environment that is approximately 400° C. to approximately 450° C.;
   (b) prior to use of the carbon-based electrode in an electro-chemical battery device, soaking the carbon-based electrode from said step (a) in an oxidizer solution including an oxidizer selected from the group consisting of peroxide, oxyacid, peroxysulfate, permanganate, ozone, vanadium oxide (V), and combinations thereof; and
   (c) during the soaking, applying a voltage potential to the carbon-based electrode, wherein the voltage potential is selected such that it does not cause evolution of oxygen from the oxidizer solution.

18. The method as recited in claim 17, wherein the voltage potential is approximately 1.4 to approximately 2.0 volts versus a standard hydrogen reference electrode.

19. The method as recited in claim 17, wherein the oxidizer solution comprises peroxide.

20. The method as recited in claim 17, wherein the oxidizer solution comprises oxyacid.

21. The method as recited in claim 17, wherein the oxidizer solution comprises peroxysulfate.

22. The method as recited in claim 17, wherein the oxidizer solution comprises permanganate.

23. The method as recited in claim 17, wherein the oxidizer solution comprises ozone.

24. The method as recited in claim 17, wherein the oxidizer solution comprises vanadium oxide (V).

* * * * *